(12) United States Patent
Shiraiwa (10) Patent No.: US 6,916,137 B2
(45) Date of Patent: Jul. 12, 2005

(54) CLAMPING DEVICE FOR TOOL HOLDER

(75) Inventor: Akio Shiraiwa, Walwick, NJ (US)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 10/918,455

(22) Filed: Aug. 16, 2004

(65) Prior Publication Data

US 2005/0047877 A1 Mar. 3, 2005

Related U.S. Application Data

(63) Continuation-in-part of application No. 10/688,998, filed on Oct. 21, 2003.

(30) Foreign Application Priority Data

Aug. 19, 2003 (JP) .......................... 2003-207909

(51) Int. Cl.⁷ ................................. B23P 15/28

(52) U.S. Cl. ..................... 407/101; 407/36; 407/44; 407/94; 407/108

(58) Field of Search .............. 82/158, 160; 407/36, 407/67, 44, 85, 88, 76, 77, 94, 101, 108

(56) References Cited

U.S. PATENT DOCUMENTS

| 106,248 A | * | 8/1870 | Bechtel | 74/424.6 |
| 2,716,799 A | * | 9/1955 | Bader | 407/67 |
| 3,214,825 A | * | 11/1965 | Williams | 407/79 |
| 3,811,162 A | * | 5/1974 | Bay | 407/108 |
| 3,865,164 A | * | 2/1975 | Sybertz | 144/230 |
| 5,209,610 A | * | 5/1993 | Arai et al. | 407/36 |
| 5,395,186 A | * | 3/1995 | Qvart | 407/46 |
| 5,669,742 A | * | 9/1997 | Sjoo et al. | 407/105 |

\* cited by examiner

Primary Examiner—Willmon Fridie, Jr.
(74) Attorney, Agent, or Firm—Burns, Doane, Swecker & Mathis, LLP

(57) ABSTRACT

A tool holder is held in a support body by a clamp which is wedged between the support body and the tool holder. The clamp is secured in the support body by a threaded fastener that extends through a through-hole formed in the clamp. The fastener carries a flange which pulls the clamp out of wedging relationship when the fastener is unscrewed. A spring disposed in the through-hole functions to keep the clamp pressed against the tool holder even after the clamp has been loosened, in order to keep the tool holder from falling out of the support body. A stopper is disposed behind the tool holder to locate the tool holder in a desired cutting position and to keep the tool holder pressed against an abutment surface of the support body.

23 Claims, 6 Drawing Sheets

CLAMPING DEVICE FOR TOOL HOLDER

RELATED INVENTION

This application is a continuation-in-part of U.S. application Ser. No. 10/688,998 filed Oct. 21, 2003 and claims priority under 35 U.S.C. §§119 and/or 365 to Patent Application Serial No. 2002-311444 filed in Japan on Oct. 25, 2002; Patent Application No. 2002-329837 filed in Japan on Nov. 13, 2002; and to Patent Application Serial No. 2003-207909 filed in Japan on Aug. 19, 2003. The entire contents of those applications are incorporated herein by reference.

BACKGROUND OF THE INVENTION

The present invention relates to a clamping device for attaching a tool holder to various kinds of machine tools including a lathe, a numerical controlled lathe and an automatic copying lathe, for example.

Figure 15:
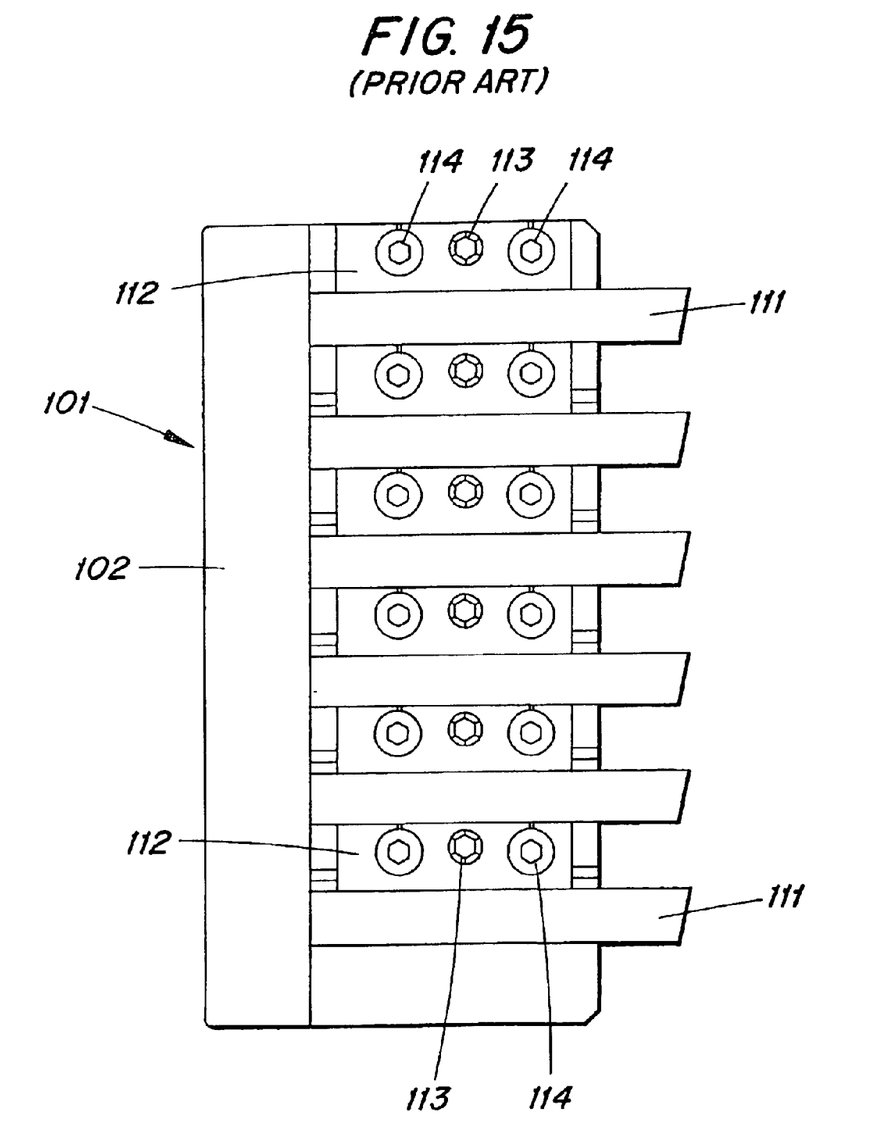
FIG. 15 depicts a prior art arrangement of tool holders.

A conventional tool assembly 101 comprising a support body 102 and a plurality of tool holders 111 is depicted in FIG. 15. A clamping device for securing each tool holder 111 in a respective recess of the support body includes a wedge clamp 112, a plurality of fastening bolts 114, and a jack-up bolt 113. The fastening bolts extend through the wedge clamp and are fastened to the support body 102, so that the tool holder can be connected to the support body via interaction between respective wedge surfaces (not shown) of the clamp 112 and the support body, which interaction pushes the clamp 112 against the respective tool holder 111, thereby pushing the tool holder against an abutment surface of the support body. When the tool holder is to be removed from the clamping device, the jack-up bolt 113 is screwed against the support body after the plural clamping bolts 114 have been loosened, so that the wedge surface of the clamp is forcefully moved away from the wedge surface of the support body. That enables the tool holder to be adjusted or replaced.

Various kinds of devices for attachment/removal of the tool holder are well known. A device for holding a tool holder shank in a machine tool is disclosed in Japanese Unexamined Patent Publication No. 2000-190110 (corresponding to U.S. Pat. No. 5,415,006). The device releasably holds a holder shank of the tool holder to which a cutting insert is attached and a lock rod is provided on a base member. The attachment/removal structure between the holder shank and the lock rod is complicated and it is difficult to reduce the size of the device.

Japanese Unexamined Patent Publication No. 2001-300802 discloses a detachable securing mechanism of a cutting tool used in a comb-type tool rest of a machine tool such as a numerical controlled lathe. The mechanism is provided with a supporting member for supporting an arrangement of plural tools. The supporting member is attached the cutting tool to the comb-type tool rest of the machine tool by fastening a plurality of mounting bolts.

Disclosed in Japanese Patent Application No. 2003-207909 is a stopper disposed in a recess behind a tool holder in abutment therewith. When a fine adjustment of the tool holder is required, the tool holder is unclamped, and a screw provided on the stopper is advanced to displace the tool holder. The stopper does not aid in pressing the tool holder against abutment surfaces of the support body.

However, in the above conventional clamping devices for a tool holder, it takes a long time to attach/remove the tool holder because it is required that a plurality of clamping bolts be fastened or loosened in order to remove the clamp.

Also, the tool holders may accidentally fall out of their recesses once they have been unclamped, e.g., due to gravity, depending on the orientation of the support body.

OBJECTS AND SUMMARY OF INVENTION

The present invention recognizes the need for reduction in size and streamlining of a tool holder, and has as an object the improvement of the tool holder, holder stopper, and tool holder clamping device for reducing the attachment/removal time and improving the positioning accuracy of the cutting edge of the cutting tool when using a clamping device to clamp a tool holder to a tool rest of a lathe, NC lathe, automatic copying lathe, or other machine tool.

At least some of the objects are achieved by a tool assembly which comprises a support body that includes a recess, the recess having an abutment surface. A tool holder is disposed in the recess in engagement with the abutment surface A holder clamp is provided which includes a wedge portion configured to be wedged in the recess for pressing the tool holder against the abutment surface in a pressing direction. A fastening structure is provided which includes a shank extending through a through-hole of the holder clamp and being threadedly secured in the support body for wedging the holder clamp within the recess. An elastic element is disposed on the holder clamp and is arranged to act between the fastener structure and the holder clamp for elastically pressing the holder clamp against the tool holder to press the tool holder against the abutment surface and resist dislodgement of the tool holder from the recess when the fastening structure is in a loosened state.

Preferably, a stopper block is provided in the recess to position the tool holder in an optimum cutting position. The stopper block is secured by a clamping arrangement similar to that used in conjunction with the tool holder.

In another aspect of the invention, a flange is disposed on the shank. The shank extends past the flange and into the support body. The flange has a greater width than the through-hole, and the holder clamp is disposed between the flange and a head of the bolt. The flange is movable together with the bolt to pull the holder clamp out of a wedged state in the groove as the bolt is unthreaded from the support body.

Preferably, a front portion of the stopper block is arranged to exert against the tool holder a force which presses the tool holder against a second abutment surface which is oriented transversely relative to the first abutment surface.

The invention also pertains to a clamp per se.

BRIEF DESCRIPTION OF THE DRAWINGS

The objects and advantages of the invention will become apparent from the following detailed description of preferred embodiments thereof in connection with the accompanying drawings in which like numerals designate like elements.

DESCRIPTION OF PREFERRED EMBODIMENTS OF THE INVENTION

Figure 1:
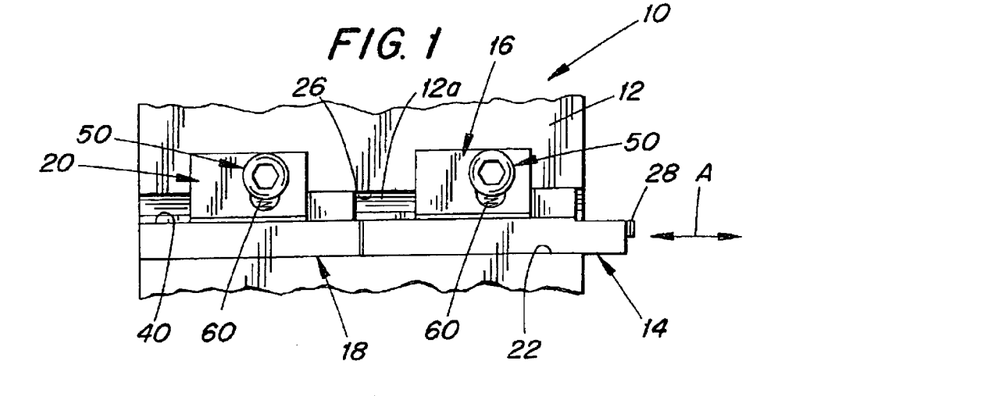
FIG. 1 is a front elevational view depicting a tool holder and a stopper block retained in a support body by respective wedge clamps, according to the invention.
Figure 2:
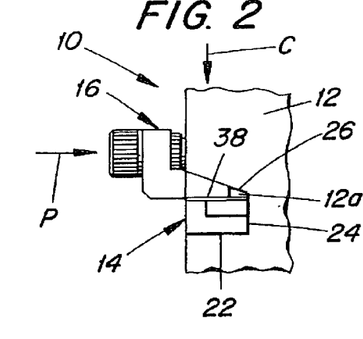
FIG. 2 is an end view of FIG. 1.

Depicted in FIGS. 1 and 2 is a tool assembly 10 comprised of a support body 12, a tool holder 14, a wedge-type holder clamp 16, a stopper block 18, and a wedge-type stopper clamp 20.

The support body 12, which can be part of a lathe, an N.C. lathe, an automatic copying lathe, or other kind of machine tool, includes a groove 12a having first and second abutment surfaces 22, 24 oriented transversely relative to one another. Overlying the first abutment surface 22, is a wedge surface 26 of the groove which converges toward the second abutment surface 24 in a direction away from an open or external side of the groove.

The tool holder 14 includes a seat in which a replaceable cutting insert 28 is mounted, the tool holder being seated on the first abutment surface 22 and engaging the second abutment surface 24.

Figure 4:
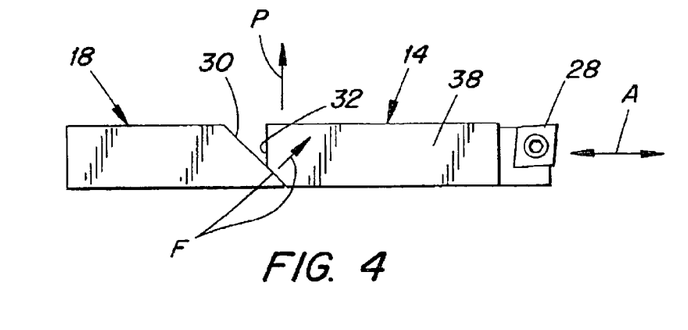
FIG. 4 is a top view of the tool holder and its respective stopper block.

The stopper block 18 is situated in the groove behind the tool holder and is slidable along the groove in a direction of adjustment A to locate the tool holder within the groove so that the cutting insert is properly positioned for a cutting operation. A front portion of the stopper block 18 includes an inclined surface 30 which engages an inclined surface 32 of a rear portion of the tool holder 14 (see FIG. 4). The inclination of the two surfaces 30, 32 is such that the stopper block 18 is able to exert against the tool holder a force F which includes a component in the direction of adjustment A, and a component directed transversely of the adjustment direction A in a pressing direction P. The force component in the pressing direction P tends to push the tool holder against the second abutment surface 24.

In order to secure the tool holder 14 in the groove, the holder clamp 16 is positioned in the groove and is wedged between the wedge surface 26 and a surface 38 of the tool holder. Likewise, the stopper clamp 20 is wedged between the wedge surface 26 and a surface 40 of the stopper block 18. The holder clamp and the stopper clamp are of identical construction and function to apply a clamping force against the tool holder and the stopper block, respectively, in a direction of clamping C oriented transversely to both the adjustment direction A and the pressing direction P.

Figure 3:
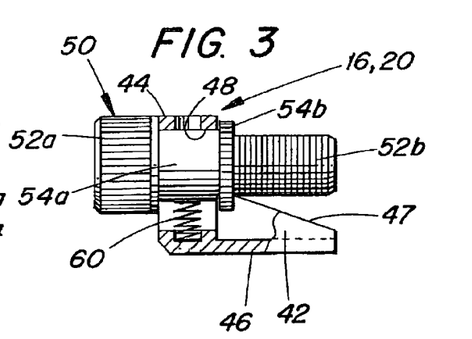
FIG. 3 is a side elevational view of a wedge clamp according to the present invention.
Figure 5:
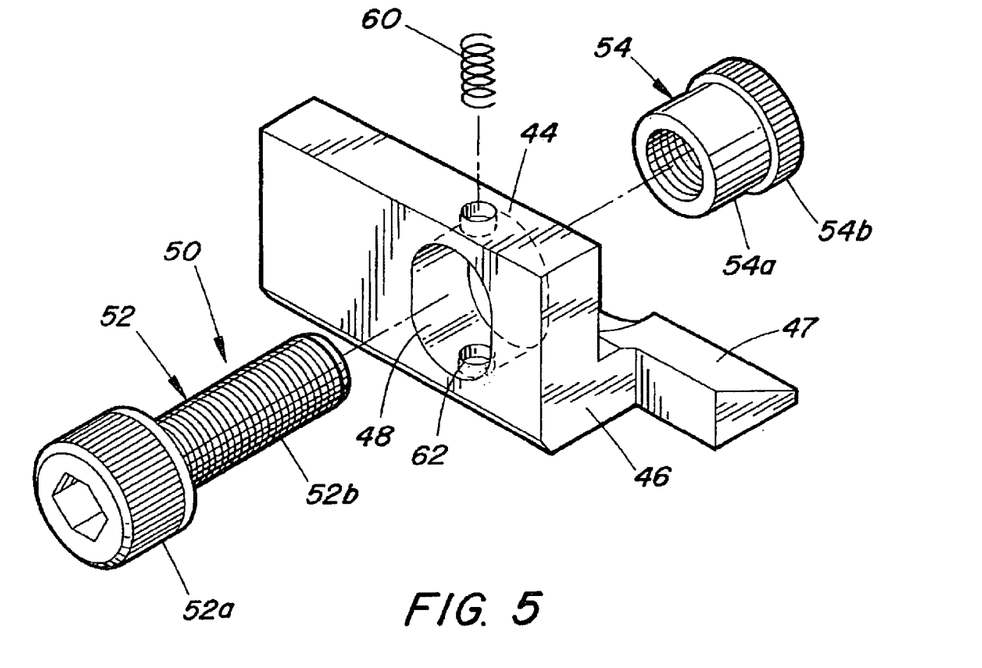
FIG. 5 is an exploded front perspective view of a first embodiment of a spring used in the wedge clamp according to the present invention.

Since the holder clamp 16 and the stopper clamp 20 are of identical construction, only the holder clamp 16 will be explained below in detail with reference to FIGS. 3 and 5.

The holder clamp 16 includes a clamping portion 42 and a mounting portion 44 oriented transversely to one another, forming an L-shape. The clamping portion 42 is of narrowing cross section in a direction away from the mounting portion 44 to define a wedge-shape. The clamping portion 42 includes a base surface 46 and an inclined wedge surface 47 for respectively engaging the holder surface 38 and the wedging surface 26. Extending through the mounting portion 44 is a through-hole 48 (see FIG. 5), preferably in the form of a slot whose length is elongated in a direction parallel to the clamping direction C. The through-hole 48 is adapted to receive a fastener structure 50 which comprises a bolt 52 and a sleeve 54 which is threadably attachable to the bolt. The bolt 52 includes a head 52a and an externally threaded shank 52b. The sleeve 54 is hollow and includes an internally threaded skirt 54a and an enlarged flange 54b that is knurled along its outer periphery.

Prior to inserting the holder clamp (or stopper clamp) into the groove, the bolt 52 is inserted through the through-hole 48 from one side of the holder clamp, and the sleeve is screwed onto the bolt from an opposite side of the holder clamp. The skirt 54a will enter the through-hole and abut against the bolt head before the sleeve flange 54b abuts the mounting portion of the holder clamp. Thus, a slight gap will be formed between the mounting portion 44 and the flange 54b, shown in FIG. 3, and the flange enabling the sleeve to rotate with the bolt relative to the clamp. It will be appreciated that the mounting portion 44 is disposed between the bolt head 52a and the sleeve flange 54b, and that the flange 54b has a greater width than the through-hole 48.

Disposed in the through-hole 48 is an elastic element preferably in the form of a coil compression spring 60 situated within a blind hole 62 which opens into the through-hole 48. The spring is arranged such that one end thereof bears against the skirt 54a of the fastener structure, and an opposite end thereof bears against the bottom of the blind hole 62. Thus, the spring functions to elastically press the holder clamp against the tool holder, thereby causing the tool holder to be pressed against the first abutment surface 22 for reasons to be explained.

Figure 6:
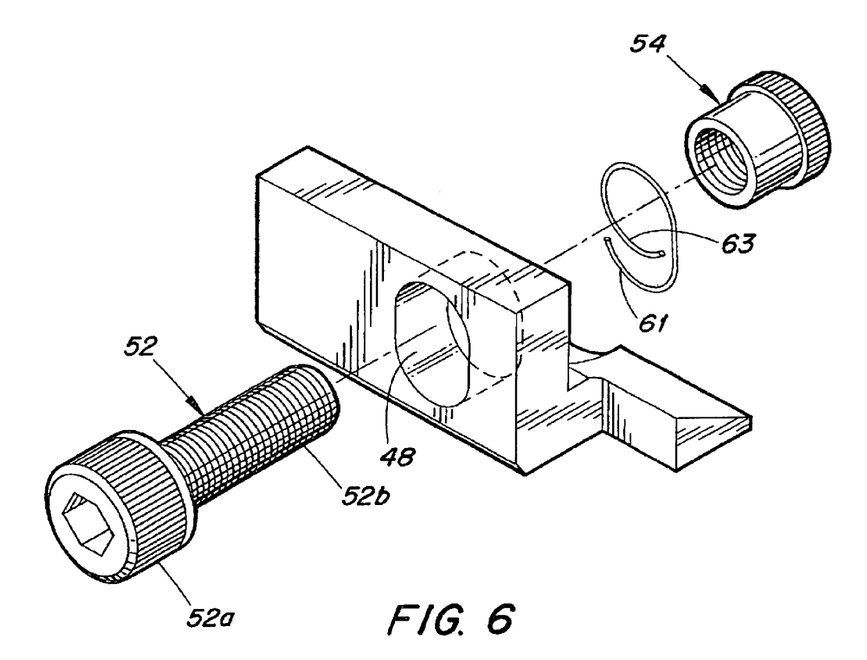
FIG. 6 is an exploded front perspective view of a wedge clamp using an alternative form of spring.

As an alternative to the coil spring 60, other types of elastic elements could be used, such as a spring 61 in the form of a wire shaped like the number "nine", as shown in FIG. 6. The sleeve of the fastener structure would extend through a closed loop 63 of the spring element 61 in order to expand the loop and energize the wire.

When it is desired to secure a tool holder 14 in the support body 12, the tool holder is positioned against the first and second abutment surfaces 22, 24, and the stopper block 18 is inserted onto the first abutment surface 22 behind the tool holder. The respective clamping portions 42 of the holder clamp 16 and the stopper clamp 20 are then inserted into the groove, and the respective bolts 52 thereof are partially screwed into threaded holes of the support body. The sleeves 54 will have previously been screwed onto the respective bolts 52. In this state, the springs 60 press the holder clamp 16 and the stopper clamp 20 against the tool holder 14 and the stopper block 18, respectively, so that the tool holder 14 and the stopper block 18 are lightly frictionally held against accidentally falling out of the support body in the event that the orientation of the support body is such that gravity is attempting to displace the tool holder and the stopper block from the recess 12a. The stopper block 18 can now be moved in the adjustment direction A, to locate the tool holder in an optimum cutting position. Then, the respective bolts 52 of the holder clamp 16 and the stopper clamp 20 are tightened so that the clamping portion 42 of each clamp becomes wedged in the groove and presses the tool holder or the stopper block against the first abutment surface 22. Also, the inclined surface 30 of the stopper block is able to exert a force in the pressing direction P against the tool holder, to aid in keeping the tool holder pressed against the second abutment surface 24.

When it is necessary to replace or adjust the tool holder, the respective bolts 52 of the holder clamp and the stopper clamp are loosened by being partially unscrewed from the support body. As this occurs, the flange 54b of each of the sleeves 54 will travel with the respective bolt away from the support body and thereby pull the holder clamp or the stopper clamp out of wedging engagement with the support body. Thus, it is unnecessary to actuate separate jack-up screws to force the clamps out of wedging engagement as in the prior art.

Once the bolts 52 have been loosened, the springs 60 continue to lightly press the holder clamp and the stopper clamp against the tool holder and the stopper block, respectively. That causes the tool holder and the stopper body to be pressed against the first abutment surface 22 and to be frictionally retained within the recess. That frictional retention will prevent the tool holder and the stopper block from falling out of the recess 12a under the action of gravity. However, the frictional retention does not prevent the tool holder from being manually adjusted or replaced.

It will be appreciated that each of the holder clamp and the stopper clamp can be removed or secured in place by actuation of only one bolt, and there is no risk of the tool holder or the stopper block accidentally falling out of the recess.

Depicted in FIGS. 7–12 are alternative embodiments of the invention. In an embodiment according to FIGS. 7–8, the stopper block 18a carries a sleeve 70 in which a spring-biased ball 72 is disposed. The ball is seated in a generally cone shaped recess 74 of the tool holder 14a to exert a force on the tool holder in the adjustment direction A and the pressing direction P.

Figure 7:
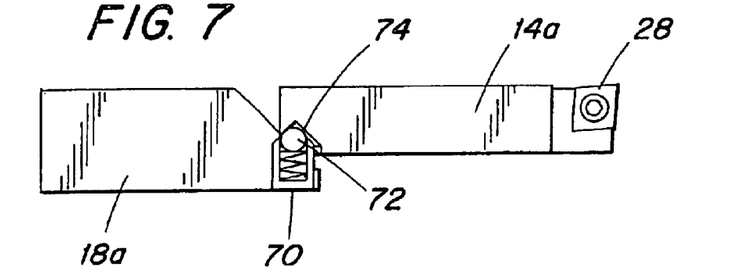
FIG. 7 is a plan view of a first modified tool holder/stopper unit.
Figure 8:
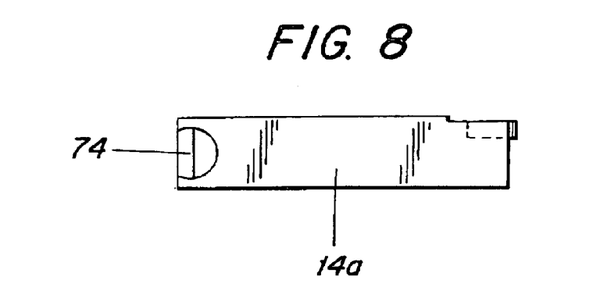
FIG. 8 is a front view of the tool holder depicted in FIG. 7.
Figure 9:
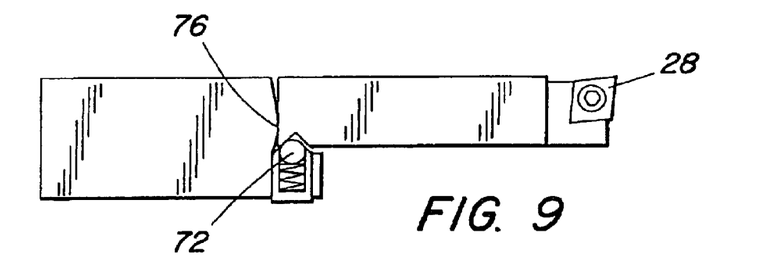
FIG. 9 is a plan view of a second modified tool holder/stopper unit according to the invention.
Figure 10:
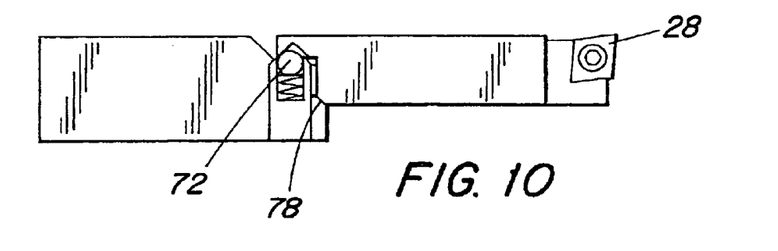
FIG. 10 is a plan view of a third modified tool holder/stopper unit according to the invention.
Figure 11:
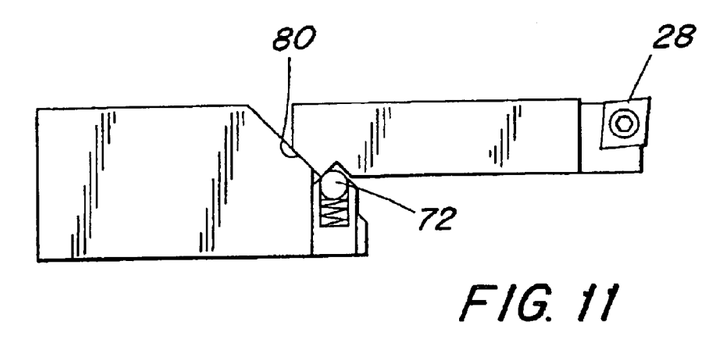
FIG. 11 is a plan view of a fourth modified tool holder/stopper unit according to the invention.

The respective embodiments according to FIGS. 9, 10 and 11 are similar to that of FIGS. 7–8, except that in FIG. 9 additional contact between the stopper body and the tool holder occurs at region 76, and via inclined surfaces at region 78 in FIG. 10, and at region 80 in FIG. 11.

Figure 12:
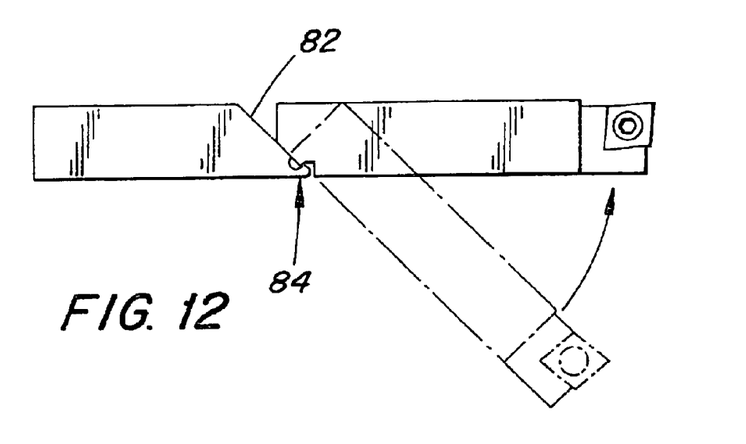
FIG. 12 is a plan view of a fifth modified tool holder/stopper unit according to the invention.
Figure 13:
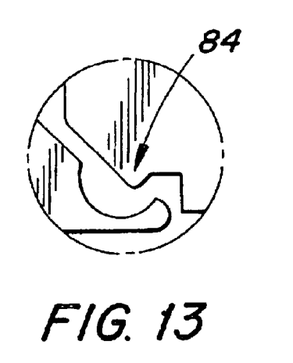
FIG. 13 is an enlarged fragmentary view of FIG. 12.
Figure 14:
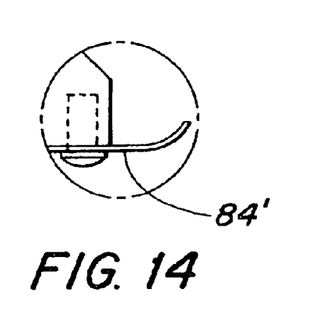
FIG. 14 is an enlarged fragmentary view showing an alternate hook shape for use in the FIG. 12 embodiment.

In FIGS. 12–13, contact between the stopper block and the tool holder occurs via inclined surfaces in region 82, plus a hook structure 84, 86 is provided which interlocks the stopper block to the tool holder. An alternative hook 84' for the stopper block is shown in FIG. 14.

It will be appreciated that in accordance with the present invention, each of the holder clamp and the stopper clamp can be unclamped by merely unscrewing one bolt. Also, due to the presence of springs in the clamps, the action of gravity will not cause the tool holder or the stopper block to fall out of the support body once the clamps have been loosened. Also, the stopper block is able to exert a force tending to maintain the tool holder against an abutment surface of the support body. Accordingly, the tool holder can be adjusted/replaced more rapidly, and positioned more accurately within the support body.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A tool assembly comprising:
   a support body including a recess, the recess having an abutment surface;
   a tool holder disposed in the recess in engagement with the abutment surface;
   a holder clamp including a wedge portion configured to be wedged in the recess for pressing the tool holder against the abutment surface in a pressing direction;
   a fastening structure including a shank extending through a through-hole of the holder clamp, the shank being threadedly secured in the support body for wedging the holder clamp within the recess; and
   an elastic element disposed on the holder clamp and arranged to act between the fastener structure and the holder clamp for elastically pressing the holder clamp against the tool holder to press the tool holder against the abutment surface and resist dislodgment of the tool holder from the recess when the fastening structure is in a loosened state.

2. The tool assembly according to claim 1 wherein the fastener structure is mounted with play in the through-hole in a direction parallel to the pressing direction.

3. The tool assembly according to claim 1 wherein the elastic element comprises a coil spring.

4. The tool assembly according to claim 3 wherein the coil spring is arranged in a blind hole formed in the holder clamp and opening into the through-hole.

5. The tool assembly according to claim 1 wherein the elastic element includes a wire in the shape of a figure nine, with the fastener structure extending through a closed loop portion of the wire.

6. The tool assembly according to claim 1 wherein the threaded shank comprises part of a bolt having a head, the fastening structure further comprising a flange disposed on the shank, the shank extending past the flange and into the support body; the flange having a greater width than the through-hole, with the holder clamp being disposed between the bolt head and the flange; the flange being movable together with the bolt away from the support body to pull the holder clamp out of a wedged state in the groove as the bolt is unthreaded from the support body.

7. The tool assembly according to claim 6 wherein the flange is threadedly mounted on the shank.

8. The tool assembly according to claim 7 wherein the flange abuts against a portion of the bolt to space the flange from the holder clamp.

9. The tool assembly according to claim 7 wherein the flange comprises part of an internally threaded sleeve mounted on an external thread of the bolt, the sleeve including a skirt extending into the through-hole and abutting against the bolt head.

10. The tool assembly according to claim 1 wherein the tool holder is adjustable relative to the tool body by being displaced within the recess in a direction of adjustment; the direction of adjustment oriented transversely relative to both the pressing direction and the shank of the fastening structure, the assembly further including a stopper disposed in the recess behind the tool holder and including a front portion engaging a rear portion of the tool holder, the stopper being displaceable in the adjustment direction for adjusting the tool holder.

11. The tool assembly according to claim 10 wherein the stopper comprises a stopper block engaging the abutment surface, and further including a stopper clamp including a wedge portion configured to be wedged in the recess for pressing the stopper block against the abutment surface in the pressing direction, wherein the stopper clamp is configured identically to the holder clamp.

12. The tool assembly according to claim 10 wherein the abutment surface constitutes a first abutment surface, the recess including a second abutment surface oriented transversely of the first abutment surface, wherein the front portion of the stopper is arranged to apply a force pressing the tool holder against the second abutment surface.

13. The tool assembly according to claim 12 wherein the front portion of the stopper includes a pressing surface engaging the tool holder, the pressing surface being inclined at an oblique angle relative to the adjustment direction to impose against the tool holder a force having a first component directed in the adjustment direction, and second component directed toward the second abutment surface.

14. The tool assembly according to claim 12 wherein the stopper carries a spring-biased member arranged to push the tool holder against the second abutment surface.

15. The tool assembly according to claim 12 wherein the stopper and the tool holder are joined together by a hook-shaped structure.

16. A tool assembly comprising:
   a support body including a recess, the recess having an abutment surface;
   a tool holder disposed in the recess in engagement with the abutment surface;
   a holder clamp including a wedge portion configured to be wedged in the recess for pressing the tool holder against the abutment surface in a pressing direction; and
   a fastening structure including:
      a bolt having a shank extending through a through-hole of the holder clamp transversely of the pressing direction, the shank being threadedly secured in the support body for wedging the holder clamp within the recess, and
      a flange disposed on the shank, the shank extending past the flange and into the support body, the flange the through-hole,
      and the holder clamp disposed between the flange and a head of the bolt, the flange being movable together with the bolt to pull the holder clamp out of a wedged state in the groove as the bolt is unthreaded from the support body.

17. The tool assembly according to claim 16 wherein the flange is threadedly mounted on the shank.

18. The tool assembly according to claim 17 wherein the flange abuts against a portion of the bolt to space the flange from the holder clamp.

19. The tool assembly according to claim 18 wherein the flange comprises part of an internally threaded sleeve mounted on an external thread of the bolt, the sleeve including a skirt extending into the through-hole and abutting against the bolt head.

20. A tool assembly comprising:
   a support body including a recess, the recess having a first abutment surface, and a second abutment surface oriented transversely of the first abutment surface;
   a tool holder disposed in the recess in engagement with the first and second abutment surfaces, and being adjustable relative to the support body by being displaced within the recess in a direction of adjustment;
   a holder clamp including a wedge portion configured to be wedged in the recess for pressing the tool holder against the first abutment surface in a pressing direction transversely of the direction of adjustment;
   a fastening structure including a shank extending through a through-hole of the holder clamp transversely of both the adjustment direction and the pressing direction, the shank being threadedly secured in the support body for wedging the holder clamp within the recess; and
   a stopper disposed in the recess behind the tool holder and including a front portion engaging a rear portion of the tool holder, the stopper being displaceable in the adjustment direction for adjusting the tool holder, wherein the front portion of the stopper is arranged to apply to the tool holder a force having a component directed for pressing the tool holder against the second abutment surface.

21. The tool assembly according to claim 20 wherein the front portion of the stopper includes a pressing surface engaging the tool holder, the pressing surface being inclined at an oblique angle relative to the adjustment direction to impose said force against the tool holder, a force also having a component directed in the adjustment direction.

22. A clamp comprising:
   a generally L-shaped body including a mounting portion and a clamping portion extending transversely thereto, the clamping portion being of narrowing cross section in a direction away from the mounting portion to define a wedge-shape;
   a through-hole extending through the mounting portion;
   a bolt including a head and a shank, the shank being threaded and extending through the through-hole;
   a hollow sleeve threadedly mounted on the shank and including a skirt disposed, with play, within the through hole and a flange spaced from the mounting portion, wherein the mounting portion is disposed between the bolt head and the flange, the flange having a greater width than the through-hole; and
   an elastic element disposed in the through-hole and acting against the skirt and the clamping portion.

23. The clamp according to claim 22 wherein the spring element comprises a coil compression spring disposed in a blind hole formed in the clamping portion.

* * * * *